United States Patent
Samukawa et al.

(10) Patent No.: US 6,593,873 B2
(45) Date of Patent: Jul. 15, 2003

(54) OBSTACLE RECOGNITION SYSTEM FOR AUTOMOTIVE VEHICLE

(75) Inventors: Yoshie Samukawa, Kariya (JP); Keiji Matsuoka, Kariya (JP); Hiroshi Ookata, Kariya (JP); Toyohito Nozawa, Kariya (JP); Noriaki Shirai, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/909,873

(22) Filed: Jul. 23, 2001

(65) Prior Publication Data

US 2002/0014988 A1 Feb. 7, 2002

(30) Foreign Application Priority Data

Jul. 26, 2000 (JP) ........................................ 2000-225348

(51) Int. Cl.[7] ................................................. G01S 13/00
(52) U.S. Cl. ..................... 342/70; 342/118; 342/119; 342/146; 342/147; 340/425.5; 701/36
(58) Field of Search .................... 342/23, 24, 27–32, 342/41, 61, 70–72, 118, 119, 146, 147; 340/425.5, 435–438; 701/96, 36, 45, 300, 301

(56) References Cited

U.S. PATENT DOCUMENTS

| 5,574,463 A | | 11/1996 | Shirai et al. |
| 5,633,705 A | * | 5/1997 | Asayama ..................... 180/167 |
| 5,710,565 A | | 1/1998 | Shirai et al. |
| 5,745,070 A | * | 4/1998 | Yamada ........................ 342/70 |
| 5,955,967 A | * | 9/1999 | Yamada ........................ 180/169 |
| 6,018,308 A | * | 1/2000 | Shirai .......................... 342/118 |
| 6,202,027 B1 | * | 3/2001 | Alland et al. ................ 701/301 |
| 6,404,328 B1 | * | 6/2002 | Alland et al. ................ 340/435 |
| 2002/0032515 A1 | * | 3/2002 | Nakamura et al. ............ 701/96 |
| 2002/0163464 A1 | * | 11/2002 | Winter et al. .................. 342/70 |

FOREIGN PATENT DOCUMENTS

| JP | A-4-248489 | 9/1992 |
| JP | A-7-140238 | 6/1995 |
| JP | A-7-318652 | 12/1995 |
| JP | A-8-279099 | 10/1996 |
| JP | A-9-218265 | 8/1997 |
| JP | A-9-318739 | 12/1997 |
| JP | A-10-54875 | 2/1998 |
| JP | A-11-38141 | 2/1999 |

* cited by examiner

Primary Examiner—Thomas H. Tarcza
Assistant Examiner—Isam Alsomiri
(74) Attorney, Agent, or Firm—Posz & Bethards, PLC

(57) ABSTRACT

An obstacle recognition system for automotive vehicles is provided which is designed to recognize targets such as preceding vehicles to be tracked by a radar by grouping data elements derived through a scan of a frontal detection range using laser pulses. The system determines the radius of a curve in a road on which a system vehicle is traveling and shifts one of the data elements from which the grouping operation is to be initiated as a function of the radius of the curve, thereby enabling the recognition of the targets without decreasing the control reliability even when the system vehicle is turning the curve.

5 Claims, 10 Drawing Sheets

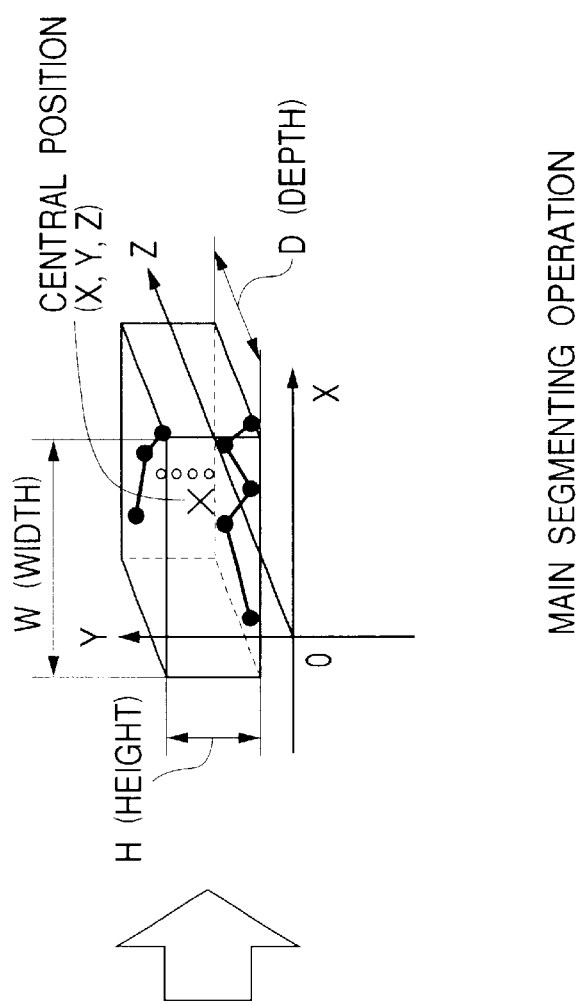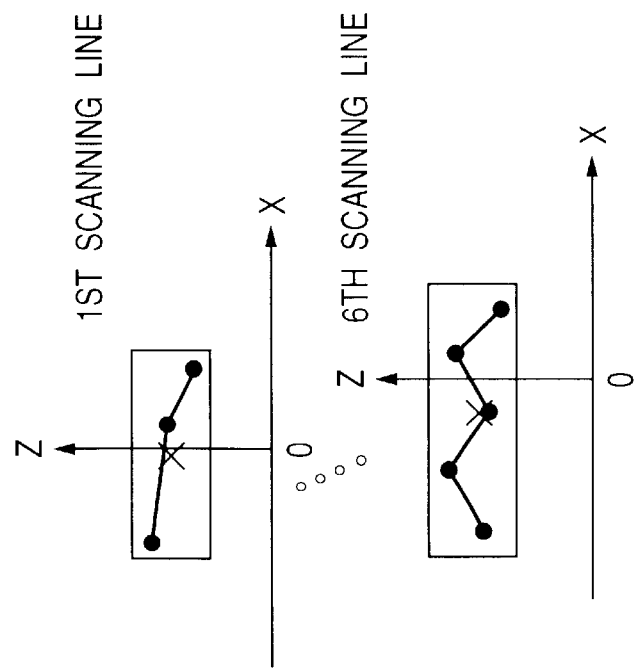

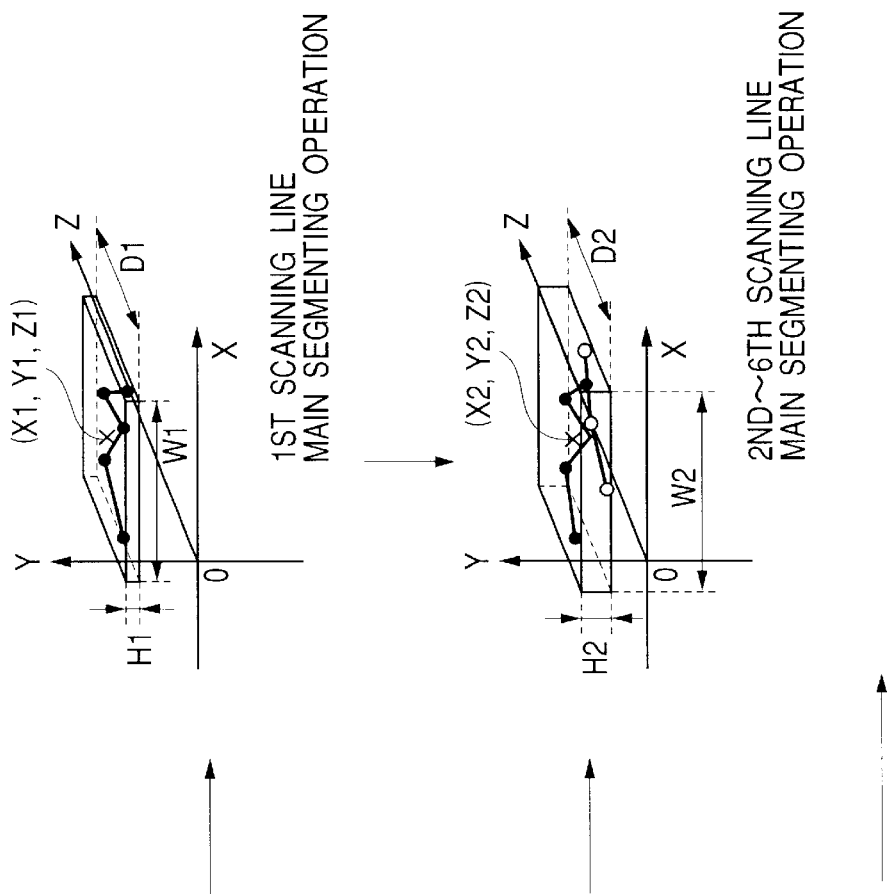
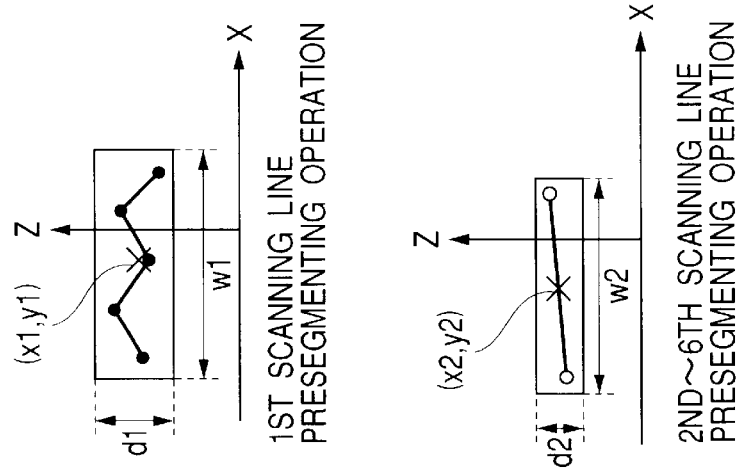

OBSTACLE RECOGNITION SYSTEM FOR AUTOMOTIVE VEHICLE

BACKGROUND OF THE INVENTION

1. Technical Field of the Invention

The present invention relates generally to an automotive obstacle recognition system equipped with a radar which is designed to emit a radar wave ahead of a vehicle and to receive a radar return to recognize an obstacle present in a frontal detection range.

2. Background Art

Automotive obstacle recognition systems are known in the art which are designed to emit radar waves such as light waves or milimetric waves over a given angular range and receive a return of the wave to recognize an object present ahead of the vehicle. As such systems, there have been proposed a collision alarm apparatus which measures the distance to an obstacle such as a preceding vehicle and outputs an alarm signal and a cruise control apparatus which controls the speed of the vehicle to keep the distance to a preceding vehicle.

Japanese Patent First Publication No. 11-38141 discloses an automotive obstacle recognition system. This system is designed to emit a sequence of radar pulses in a given scanning direction which is either of two directions: a horizontal direction (i.e., a width-wise direction of a vehicle) and a vertical direction without sweeping the pulse sequence in a reference direction that is the other of the horizontal and vertical directions and receive returns of the radar pulses from an object to determine the distance to and angular position of the object. After completion of processing of data sampled over one scanning line, the system shifts the scanning direction to the reference direction and emits a second sequence of radar pulses in the shifted scanning direction. This operation is repeated until completion of scanning of the whole of a detection range, thereby determining the distance to the object and two angular positions of the object in the vertical and horizontal directions. This is known as a three-dimensional recognition system.

The above automotive obstacle recognition system recognizes radar returns as dots and collects some of them over one scanning line which meet given conditions related to the location thereof and the interval therebetween in a width-wise direction of the system vehicle into one group as a presegment and also collects some of the presegments which meet a condition in which the interval between adjacent two of the presegments is shorter than a given distance in addition to the above conditions into one group as a main segment.

In order to save RAMs and decrease the operating time, the automotive obstacle recognition system does not handle all of the points recognized over one scanning line, but groups some of the points, which are arrayed across a central one along one scanning line and which meet the given conditions, together as the presegment. When the number of presegments reaches a given upper limit, the presegmenting operation is terminated. In practice, the system scans 105 points on one scanning line and analyzes the points alternately in the right and left directions from the 53th point that is a central one of the 105 points to produce the presegment.

For instance, when the system vehicle is running around a curve, the obstacle recognition system may detect a roadside obstacle near a central area of the radar detection range, while a preceding vehicle or target may be detected near an end of the radar detection range. In this case, since the presegmenting operation is, as described above, initiated from a central one of points recognized over one scanning line, the number of presegments may, as shown in FIG. 11, reach the upper limit before the target, as enclosed with a broken line, is recognized by the system. Specifically, the above obstacle recognition system encounters the problem in that a preceding vehicle is running on the same lane as the system vehicle, but it may not be tracked by the system.

SUMMARY OF THE INVENTION

It is therefore a principal object of the invention to avoid the disadvantages of the prior art.

It is another object of the invention to provide an obstacle recognition system for automotive vehicles which is designed to recognize targets such as preceding vehicles to be tracked by a radar precisely with a decreased capacity of memory even when a system vehicle is turning a curve.

According to one aspect of the invention, there is provided an obstacle recognition apparatus for a vehicle which comprises: (a) a radar emitting radar waves to scan a given angular range in a width-wise direction of a vehicle equipped with the obstacle recognition apparatus, the radar receiving returns of the radar waves from objects present in the given angular range to determine distances to and angular directions of the objects in the width-wise direction of the vehicle; (b) a curve radius determining circuit determining a radius of a curve in a road on which the vehicle is traveling; and (c) an obstacle recognition circuit analyzing the returns of the radar waves received by the radar to recognize as targets a given number of the obstacles which are closer to a reference angular direction defined within the given angular range, the obstacle recognition circuit changing the reference angular direction based on the radius of the curve determined by the curve radius determining circuit.

In the preferred mode of the invention, the obstacle recognition circuit analyzes the returns of the radar waves to recognize the obstacles as points in a coordinate system and performs a grouping operation to collect some of the points which meet a first grouping condition into groups. The grouping operation is initiated from the reference angular direction to the width-wise direction of the vehicle.

The radar scans the given angular range along scanning lines which extend in the width-wise direction of the vehicle and arrayed at given intervals in a vertical direction of the vehicle within a given vertical angular range. The obstacle recognition circuit performs a second grouping operation to collect some of the points into the groups in each of the scanning lines and also some of the groups which meet a second grouping condition into second groups as expressing the obstacles.

The number of the groups formed in the grouping operation along the scanning lines defined in end portions of the given angular range in a height-wise direction of the vehicle is smaller than that along the scanning lines defined in a central portion of the given angular range in the height-wise direction of the vehicle.

The obstacle recognition circuit determines a change in the reference angular direction as a function of a shift in angular direction from a central angular direction in the given angular range based on the radius of the curve determined by the radius curve determining circuit.

According to the second aspect of the invention, there is provided an obstacle recognition apparatus for a vehicle which comprises: (a) a radar emitting radar waves to scan a given angular range in a width-wise direction of a vehicle equipped with the obstacle recognition apparatus, the radar receiving returns of the radar waves from objects present in the given angular range to determine distances to and angular directions of the objects in the width-wise direction of the vehicle; (b) a curve determining circuit determining whether a road on which the vehicle is traveling is curved or not; and (c) an obstacle recognition circuit analyzing the returns of the radar waves received by the radar to recognize as targets a given number of the obstacles which are closer to a reference angular direction defined within the given angular range, when it is determined by the curve determining circuit that the road is curved, the obstacle recognition circuit shifting the reference angular direction in an inward direction of the curved road.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 7(a) shows data elements grouped in a presegmenting operation;

FIG. 7(b) shows data elements grouped in a main segmenting operation to produce main segment data;

FIGS. 8(a) and 8(b) show steps of producing main segment data in each scanning line;

DESCRIPTION OF THE PREFERRED EMBODIMENTS

Figure 1:
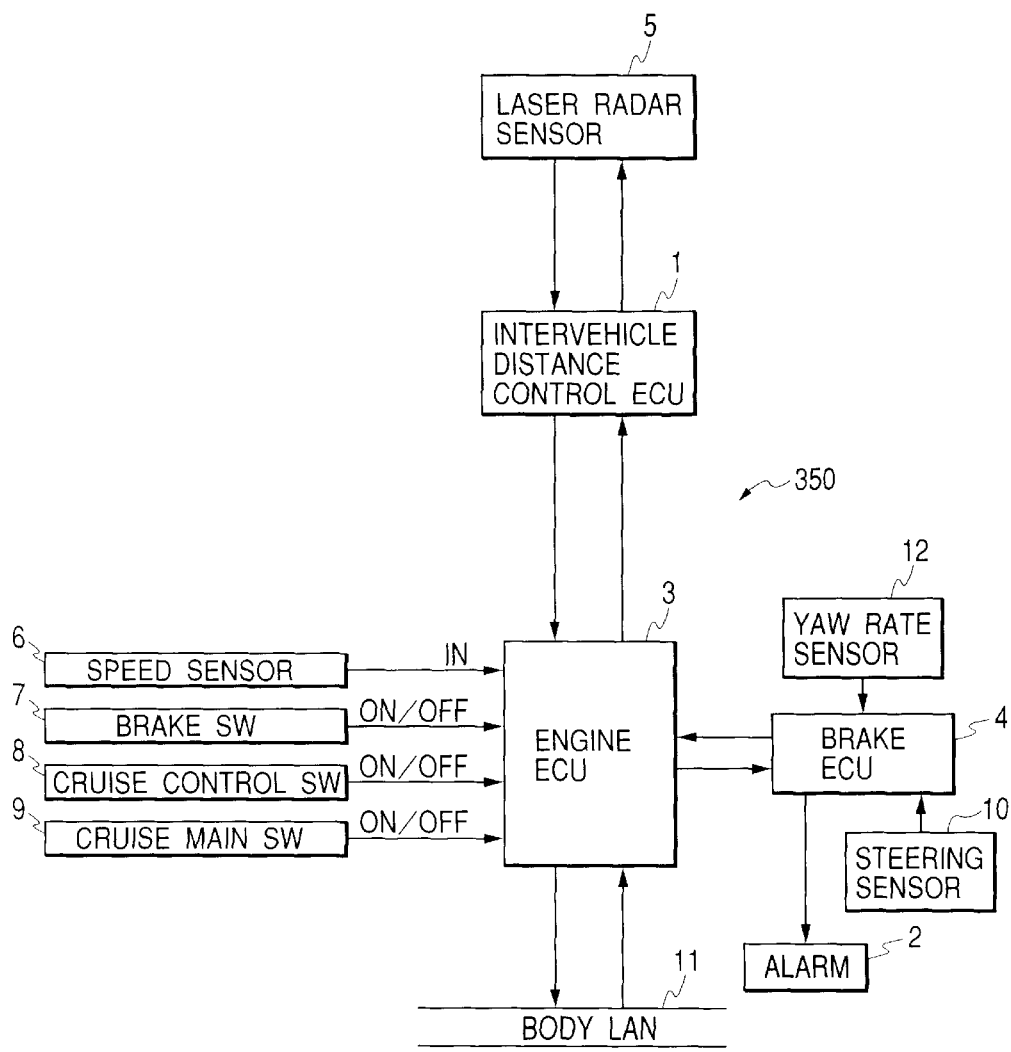
FIG. 1 is a block diagram which shows an obstacle recognition system for automotive vehicles according to the invention.

Referring to the drawings, wherein like reference numbers refer to like parts in several views, particularly to FIG. 1, there is shown an automotive obstacle recognition system 350 according to the invention which includes generally an intervehicle distance controlling electronic control unit (ECU) 1, an engine electronic control unit (ECU) 3, a brake electronic control unit (ECU) 4, and a laser radar sensor 5.

The intervehicle distance controlling ECU 1 consists essentially of a microcomputer and is designed to receive an actual vehicle speed (Vn) signal, a steered angle (Str-eng) signal, a yaw rate signal, a target intervehicle distance signal, a wiper switch information signal, and controlled-condition signals indicative of an idling and braking control conditions from the engine ECU 3. The intervehicle distance controlling ECU 1 works to determine the radius R of a curve in a road on which a vehicle equipped with this system (will be referred to as a system vehicle below) is traveling based on the steered angle signal or the yaw rate signal and transmits it to the laser radar sensor 5 together with the actual vehicle speed signal. Note that the target intervehicle distance signal outputted by the engine ECU 3 may be expressed by the time required for the system vehicle to reach a target, the distance into which the required time is converted, or the quotient of a target intervehicle distance by the vehicle speed. The intervehicle distance controlling ECU 1 receives the target intervehicle distance signal to control the interval between the system vehicle and a target.

The laser radar sensor 5 consists essentially of a laser scan distance measuring unit and a microcomputer and is designed to output a diagnostic signal and to determine a same lane probability that a preceding vehicle exists in the same lane of a road as that of the system vehicle using the angular position of the preceding vehicle and the relative speed measured by the laser scan distance measuring unit, and signals indicative of the actual vehicle speed (Vn) and the radius R of a curve in the road on which the system vehicle is traveling outputted from the intervehicle distance controlling ECU 1 and output the same lane probability as preceding vehicle information containing the relative speed etc. to the intervehicle distance controlling ECU 1. An example of determination of the same lane probability is taught in U.S. Pat. No. 5,710,565 issued on Jan. 20, 1998, assigned to the same assignee of this application, disclosure of which is incorporated herein by reference. The laser radar sensor 5 also works to perform a segmenting operation, as will be described later in detail.

The laser scan distance measuring unit may be implemented by a known radar device and is designed to emit and swing a transmit wave or laser beam in a width-wise direction and a vertical direction of the system vehicle over a given scan range and to receive a return from an object present in the scan range to determine an interval between the system vehicle and the object in correspondence to a scan angle.

The intervehicle distance controlling ECU 1 analyzes the same lane probability contained in the preceding vehicle information provided from the laser radar sensor 5 to determine whether an object detected by the laser radar sensor 5 is a preceding vehicle or not which should be tracked as a target in controlling the distance thereto. When the detected object is determined as the target, the intervehicle distance controlling ECU 1 outputs a target acceleration signal, a fuel cut request signal, an OD cut request signal, a 3rd-shift down request signal, and a brake request signal to the engine ECU 3 as control signals for keeping the distance between the system vehicle and the target at a safe interval. The intervehicle distance controlling ECU 1 also determines whether an alarm signal should be outputted or not and outputs an alarm request signal when the system vehicle has entered a warning distance. The intervehicle distance controlling ECU 1 also outputs a diagnostic signal and a display data signal.

The brake ECU 4 is made of an electronic circuit consisting essentially of a microcomputer and receives the steered angle (Str-eng) signal and the yaw rate signal from a steering sensor 10 and a yaw rate sensor 12 to determine the steered angle (Str-eng) and the yaw rate of the system vehicle and output these data to the intervehicle distance controlling ECU 1 through the engine ECU 3. The brake ECU 4 receives the control signals (i.e., the target acceleration signal and the brake request signal) from the intervehicle distance controlling ECU 1 through the engine ECU 3 and actuates brake units to control the brake hydraulic pressure. The brake ECU 4 also is responsive to the alarm request signal from the intervehicle distance controlling ECU 1 to turn on an alarm buzzer 14, thereby informing the vehicle operator of the possibility of collision.

The engine ECU 3 is made of an electronic circuit consisting essentially of a microcomputer and receives signals from a vehicle speed sensor 6, a brake switch 7, a cruise control switch 8, and a cruise main switch 9. The vehicle speed sensor 6 monitors the speed of the system vehicle. The brake switch 7 provides a signal indicating whether a brake pedal is depressed or not. The engine ECU 3 also receives wiper switch information and tail switch information through a body LAN 11, the steered angle (Str-eng) signal and the yaw rate signal from the brake ECU 4, and the target acceleration signal, the fuel cut request signal, the OD cut request signal, the $3^{rd}$-shift down request signal, the brake request signal, the alarm request signal, the diagnostic signal, and the display data signal from the intervehicle distance controlling ECU 1. The engine ECU 3 analyzes the received signal to determine operating conditions of the system vehicle and controls a throttle actuator, a transmission, etc:. (not shown) and also transmits a necessary display information signal through the body LAN 11 to a display unit such as an LCD (not shown) and the actual vehicle speed (Vn) signal, the steered angle (Str-eng) signal, the yaw rate signal, the target intervehicle distance signal, the wiper information signal, and the controlled condition signals indicative of the idling control of the engine, the brake control, etc. to the intervehicle distance controlling ECU 1.

Figure 2:
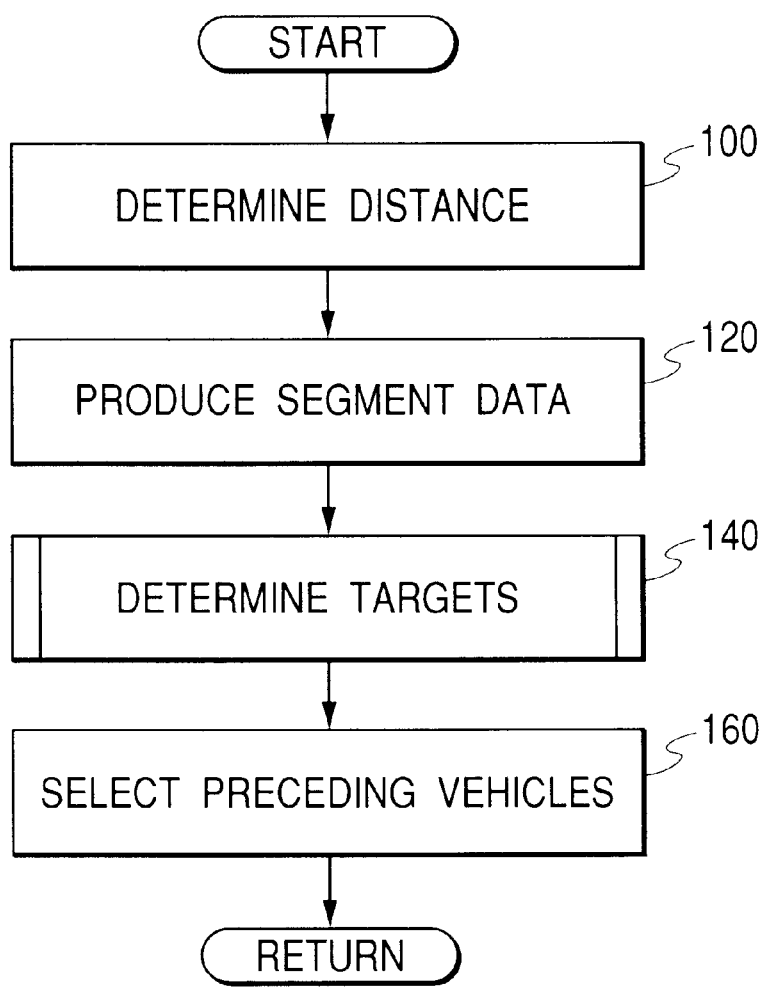
FIG. 2 is a flowchart of a program performed to recognize a target preceding vehicle.

FIG. 2 shows a main program performed by the obstacle recognition system 350 to recognize obstacles detected by the laser radar sensor 5 as targets.

Figure 4:
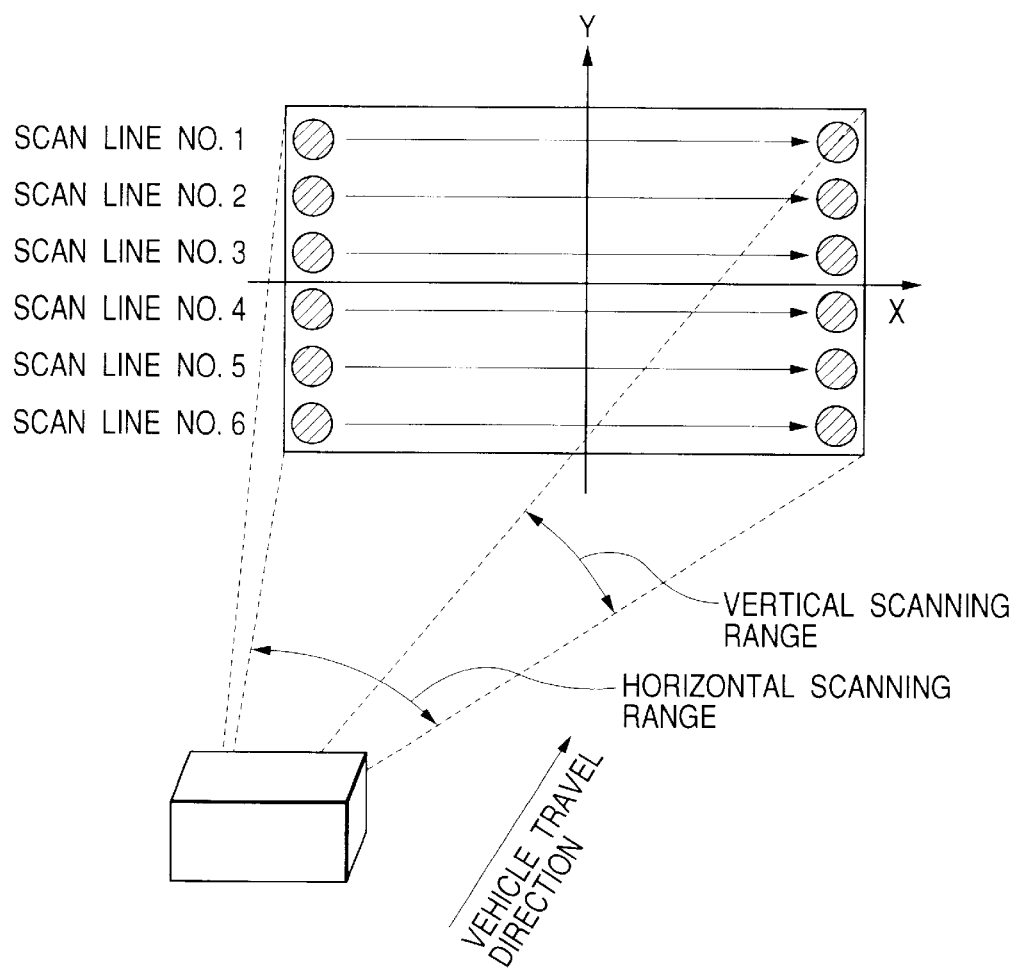
FIG. 4 is a perspective view which shows a radar detection zone scanned by a radar to detect frontal obstacle.

After entering the program, the routine proceeds to step 100 wherein a distance measuring operation is performed. Specifically, the laser radar sensor 5 scans a preselected area (i.e., a radar detection zone), as shown in FIG. 4, defined on an X-Y-plane perpendicular to the direction of travel of the system vehicle (i.e., the Z-axis extending in parallel to the central optical axis of the laser radar sensor 5). The X-axis indicates the direction in which scanning lines No. 1 to No. 6 extend horizontally, while the Y-axis indicates an elevation of the radar detection zone. The radar detection zone is defined by 0.15°×105 laser pulses =16° in the X-axis direction and 4.4° in the Y-axis direction. The width of each laser beam swept horizontally is equivalent to 0.9°. An overlap between adjacent two of the laser beams is equivalent to 0.2°. A pitch of the laser beams is, thus, 0.9°−0.2°=0.7°. The vertical scanning range of 4.4° is expressed by 0.45°+0.70×5+0.45°. The scan is performed from left to right and from top to bottom of the radar detection zone. In practice, a sequence of laser pulses are first swept along the uppermost scanning line (i.e., the scanning line No. 1) in the X-axis direction. Upon reaching the right end of the scanning line No. 1, the second sequence of laser pulses are swept along the scanning line No. 2 defined immediately below the scanning line No. 1. In this way, the scans are performed up to the scanning line No. 6 to derive 105 laser pulses ×6 scanning lines=a total of 630 data components in the laser radar sensor 5.

The laser radar sensor 5 first derives data indicative of horizontal and vertical scanning angles θx and θy and the distance r to each, tracked object and transfers it to a point in an X-Y-Z rectangular coordinate system whose origin (0, 0, 0) is defined on the system vehicle. The horizontal scanning angle θx is the angle which a line of an output laser beam projected onto the X-Z plane makes with the Z-axis. The vertical scanning angle θy is the angle which the output laser beam makes with the X-Z plane. The transferred data is used in a grouping operation, as will be described later in detail.

Figure 5B:
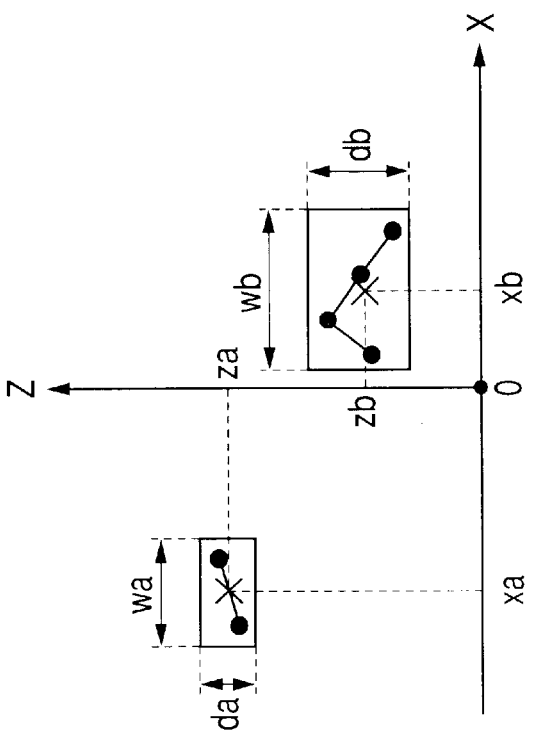
FIG. 5(b) shows data elements as expressed in an X-Y-Z rectangular coordinate system which are grouped in a pre-segmenting operation to produce presegment data.
Figure 5A:
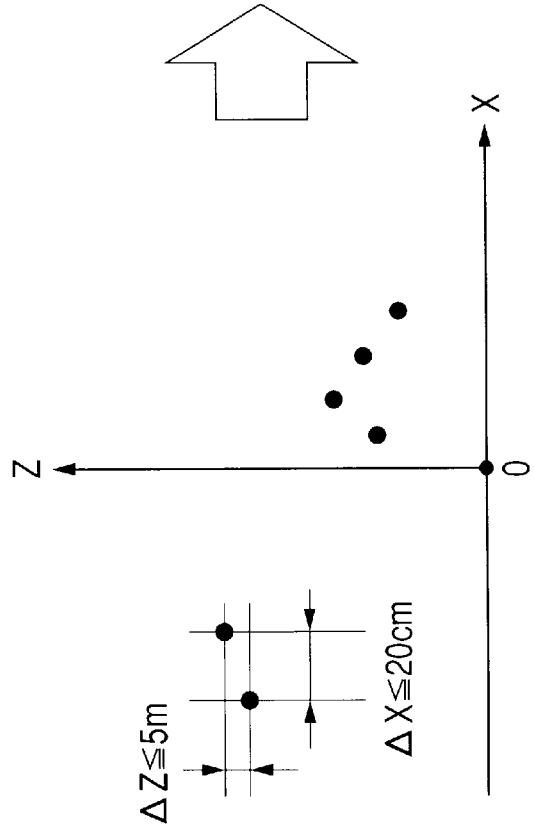
FIG. 5(a) shows data elements recognized as dots in a distance measuring operation in a laser radar sensor.

After step 100, the routine proceeds to step 120 wherein a presegmenting operation and a main segmenting operating are performed. The presegmenting operation is to collect ones of data elements as expressed by X-Y-Z rectangular coordinates, that is, points defined in the X-Y-Z rectangular coordinate system which meet given grouping conditions into a group to produce presegment data which indicates, as shown in FIG. 5(b), a two-dimensional area defined on the X-Z plane in the X-Y-Z coordinate system. FIG. 5(a) illustrates data elements recognized as points in the distance measuring operation in step 100.

In this embodiment, from among data elements or points defined in the X-Y-Z rectangular coordinate system, ones whose interval ΔX in the X-axis direction, as shown in FIG. 5(a), is less than or equal to 20 cm and interval ΔZ in the Z axis direction is less than or equal to 5 m are collected into a group(s) to produce the presegment data. The presegment data is data specifying a minimum rectangular area which is defined by two sides extending parallel to the X-axis and two sides extending parallel to the Z-axis and contains all the points in each group. Specifically, the contents of the presegment data are central coordinates (X, Z) of the rectangular area and lengths (W, D) of the long and short sides of the rectangular area. In the example illustrated in FIG. 5(b), two presegment data: one indicating (xa, za) and (wa, da) and the other indicating (xb, zb) and (wb, db) are derived. Note that w indicates the length of the sides of the rectangular area extending parallel to the X-axis, and d indicates the length of the sides of the rectangular area extending parallel to the Z-axis.

The presegmenting operation will be described below in more detail. In the first step, an initial point at which the presegmenting operation should be started is determined based on the radius R of a curve in a road on which the system vehicle is now running. The initial point is defined by one of laser beams emitted from the laser radar sensor 5 which will be specified by an objective beam number below.

Figure 9:
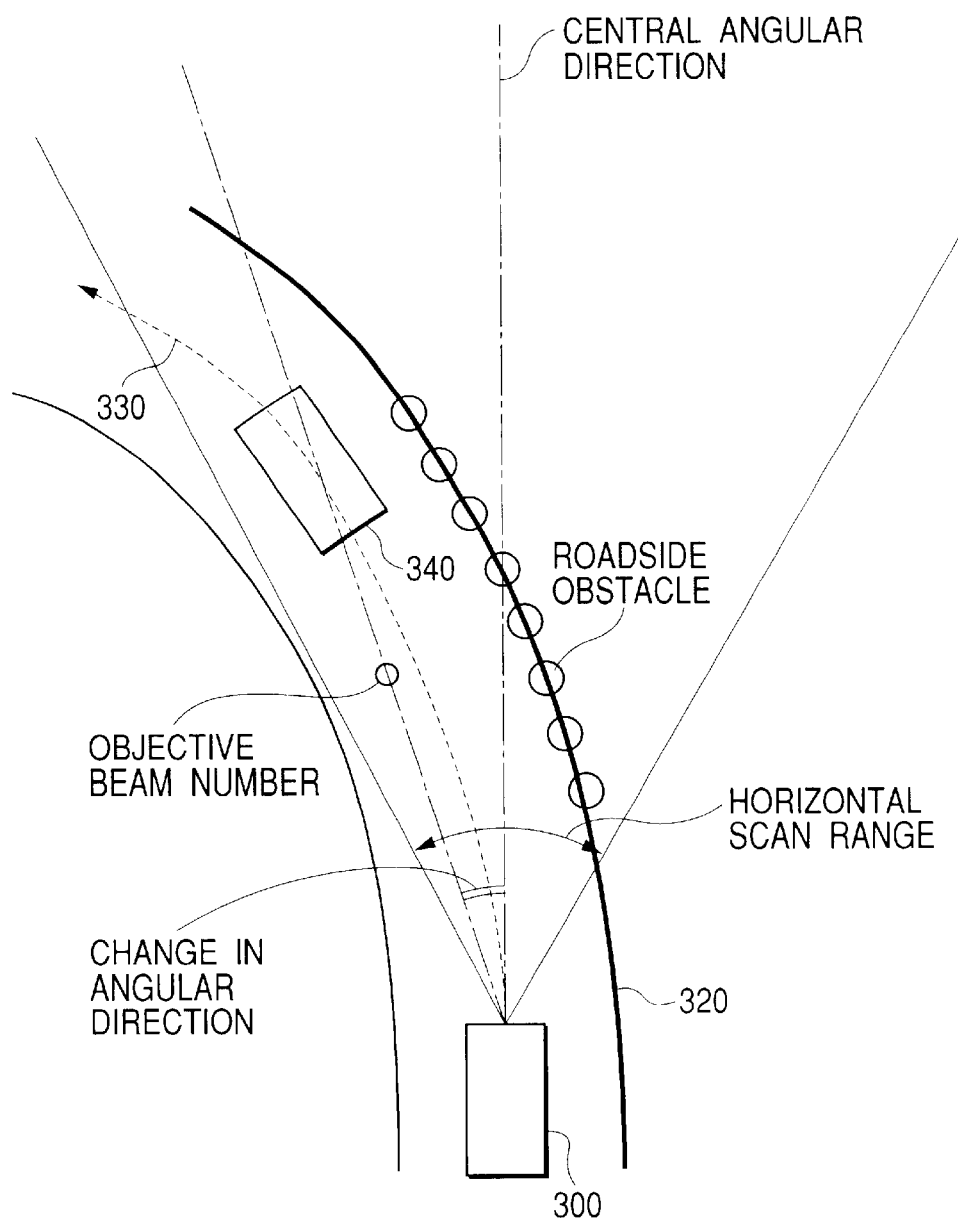
FIG. 9 is a view which shows how to determine an objective beam number when a system vehicle is turning a curve.

The objective beam number is, as shown in FIG. 9, determined by an angular shift from the central angular direction of the radar detection zone. The presegmenting operation, as will be described later in detail, is performed from the objective beam number to identify a target preceding vehicle 340 running on the same lane 330 as the system vehicle 300 precisely even when the system vehicle 300 is traveling on a curved road 320.

Figure 6:
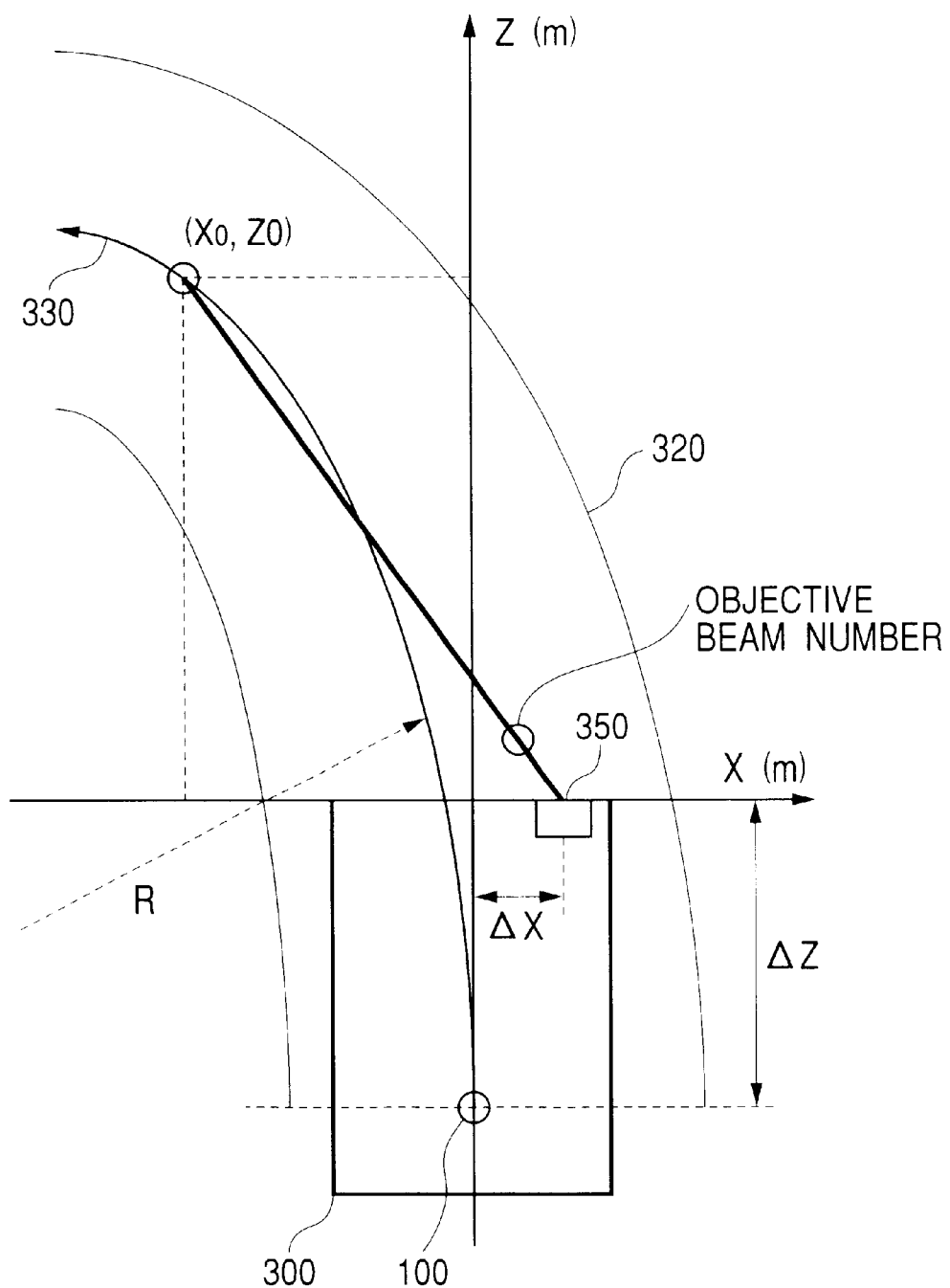
FIG. 6 is a view which shows a positional relation between an obstacle recognition system installed in a system vehicle and a target present in a curve ahead of the system vehicle.

The objective beam number is found, as shown in FIG. 6, by calculating a lateral position of a given point $(X_0, Z_0)$ in a coordinate system whose origin is defined at a turn center 100 of the system vehicle 300. Note that $X_0$ is a coordinate indicating a lateral position of the given point in a widthwise direction of the system vehicle 300, and $Z_0$ is a coordinate indicating a frontal position of the given point in a direction of traveling of the system vehicle 300.

The lateral position $X_0$ is determined, as shown in Eq. (1) below, based on a preselected position $Z_0$ (e.g., a frontal position defined 60 m away from the system vehicle 300) and the radius R of the curve in the road on which the system vehicle 300 is traveling.

$$X_0 = Zr^2/2R + \Delta X \qquad (1)$$

$$Zr^2 = Z_0 + \Delta Z$$

where $\Delta X$ and $\Delta Z$ indicate X-axis and Y-axis offsets of a location at which the obstacle recognition system 350 is installed on a body of the system vehicle 300 from the turn center 100. The turn center 100 is the center about which the system vehicle 300 makes a turn when a vehicle operator moves a steering wheel.

The lateral position $X_0$ may also be determined according to Eq. (2) below.

$$X_0 = \text{(objective beam number--central beam number)} \times Z_0 \times 0.15 \times \pi 180 \qquad (2)$$

where 0.15 is the scan angle (deg) of each laser beam in one scanning line, and the central beam number is the number of a central one of laser beams in one scanning line. In this embodiment, since 105 points are, as described above, scanned in each scanning line, the central beam number is the number of the 53rd laser beam. In Eq. (2), the lateral position $X_0$ is derived by the product of a difference between the objective beam number and the central beam number and an interval of the scan angle on a circle passing through the z-coordinate $Z_0$ of the given point $(X_0, Z_0)$ as expressed by converting the scan angle in unit from degree into radian.

Setting values of $X_0$ derived in Eqs. (1) and (2) equal to each other, we obtain Eq. (3) below.

$$\text{Objective beam number} = \text{central beam number} \times \{(Zr^2/2R + \Delta X) \times 180\}/Z_0 \times (0.15 \times \pi) \qquad (3)$$

Figure 10:
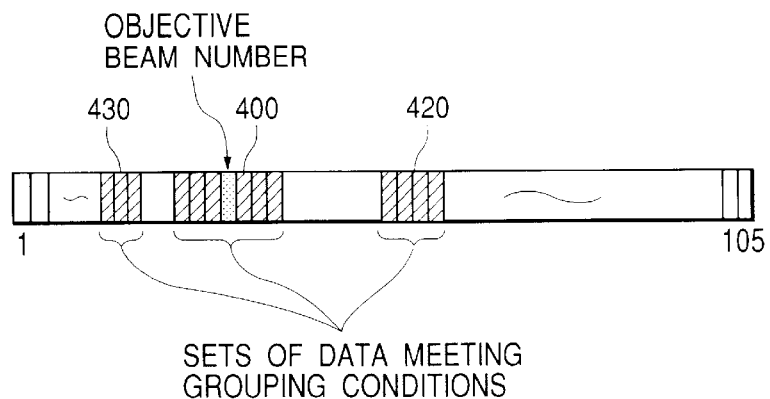
FIG. 10 is a view which shows a sequence of presegmenting operations initiated from an objective beam number.
Figure 11:
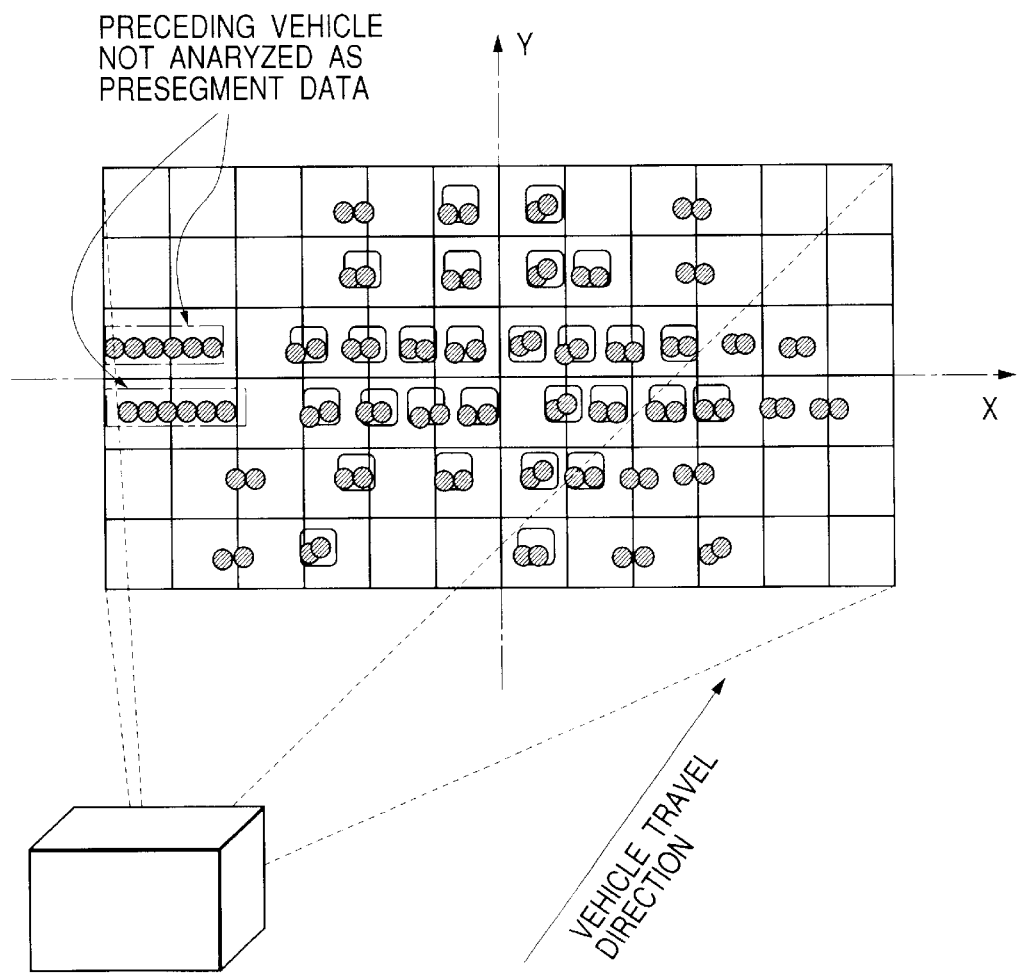
FIG. 11 shows a problem encountered in a conventional system that a preceding vehicle that is a target to be tracked by a radar is not subjected to a presegmenting operation.

From a data component or X-Y-Z rectangular coordinate-transferred point derived by a laser beam of the objective beam number thus determined and recognized by the laser radar sensor 5, the presegmenting operation is, as shown in FIG. 10, initiated. Specifically, from the point derived by the laser beam of the objective beam number, ones of points recognized by the laser radar sensor 5 and arrayed horizontally which meet the above described grouping conditions are collected into a group to produce the presegment data. Subsequent grouping operations are performed alternately from the first group in the horizontal direction. The second grouping is initiated from the points on the right or left side whichever is closer to the first group. In an example of FIG. 10, the grouping operations are performed in the order of 400, 430, and 420.

When the number of groups or presegment data reaches a given upper limit, the presegmenting operation is terminated. In this embodiment, the upper limit of the presegmenting operations in the central third and fourth scanning lines is set to the greatest value of twelve (12). The upper limit in the second and fifth scanning lines is set to eight (8). The upper limit in the first and sixth scanning lines is set to four (4). This results in decreases in RAM and time for the presegmenting operation. The reason why the upper limit in the third and fourth scanning lines is greater than that in the first and sixth scanning lines is because near vertical ends of the scanned area (i.e., the radar detection zone), billboards or cat's-eyes are usually detected, and data on a central portion of the scanned area are expected to indicate a target object such as a preceding vehicle.

The main segmenting operation will be described below in detail.

The main segmenting operation is to collect some of the presegment data which meet given grouping conditions into a group to produce main segment data. The main segment data will also be referred to as a main segment below. The main segmenting operation may either be performed after completion of the presegmenting operations on all the scanning lines or each time the presegmenting operation on each scanning line is completed.

The main segment data represents, as shown in FIG. 7(b), a three-dimensional space in a rectangular coordinate system defined by the X-axis extending in the width-wise direction of the system vehicle, the Y-axis, extending in the vertical direction of the system vehicle, and the Z-axis extending in the direction of traveling of the system vehicle. Specifically, the main segment data is data specifying a minimum rectangular parallelopiped or rectangular space which is defined by faces extending parallel to the X-axis, Y-axis, and the Z-axis and contains some of the groups of the points recognized in the first to sixth scanning lines which meet the given grouping conditions as discussed later. The contents of the main segment data are central coordinates (X, Y, Z) of the rectangular parallelopiped and lengths (W, H, D) of three of the faces in the X-axis, the Y-axis, and the Z-axis directions. "W" indicates the width of the rectangular parallelopiped. "H" indicates the height of the rectangular parallelopiped. "D" indicates the depth of the rectangular parallelopiped.

In the main segmenting operation, some of the presegment data derived in the same scanning line and the main segment data derived one scanning line earlier which are close to each other in the three-dimensional space in the X-Y-Z coordinate system are collected, as will be described later in detail, into a group. The main segmenting operation is initiated from the uppermost scanning line (i.e., the first scanning line) to the lowermost scanning line (i.e., the sixth scanning line). When the number of the groups or main segment data reaches a given value (e.g., 16 in this embodiment), the main segmenting operation is terminated.

The main segmenting operation will be discussed below in detail with reference to FIGS. 8(a) and 8(b).

First, the presegment data of the first scanning line is analyzed to produce the main segment data thereof. If the lengths of two sides of a rectangular area specified by the presegment data of the first scanning line are defined as w1 and d1, and the central coordinates thereof are defined as x1 and z1, respectively, the lengths (W1, H1, D1) of three faces and central coordinates (X1, Y1, Z1) of a rectangular parallelopiped as the main segment data of the first scanning line are determined in the following manner. First, the lengths (W1, H1, D1) are determined by defining the lengths w1 and d1 in the first scanning line presegment data as the lengths W1 and D1, respectively, and by transforming 0.7° that is an angular resolution of one scanning line in the Y-axis direction, as expressed in the polar coordinate system into the distance as expressed in the rectangular coordinate system and defining it as the length H1. The central coordinates (X1, Y1, Z1) are determined by defining the coordinates x1 and z1 in the first scanning line presegment data as the coordinates Y1 and Z1, respectively, and by transforming the angle which a line extending from the origin of the X-Y-Z coordinate system to the first scanning line makes with the X-Z plane, as expressed in the polar coordinate system into the distance, as expressed in the rectangular coordinate system and defining it as the coordinate Y1. The width of each laser beam swept horizontally is equivalent to 0.9°. An overlap between adjacent two of the laser beams is equivalent to 0.2°. A pitch of the laser beams is, thus, 0.9°−0.2°=0.7°. The coordinate Y1 is determined on the basis of a longitudinal center line of each laser beam (i.e., the scanning line) extending at an interval of 0.7°/2=0.35° away from the side of the laser beam.

Next, the presegment data on the second scanning line is analyzed to produce the main segment data thereof. If the lengths of two sides of a rectangular area specified by the presegment data on the second scanning line are defined as w2 and d2, and the central coordinates thereof are defined as x2 and z2, respectively, the lengths (W2, H2, D2) of three faces and central coordinates (X2, Y2, Z2) of a rectangular parallelopiped are determined in the following manner. First, the two lengths W2 and D2 are determined as lengths of two sides of a rectangular area which is so defined as to contain both a rectangular area defined on the X-Z plane by W1 and D1 of the first scanning line main segment data and a rectangular area defined on the X-Z plane by w2 and d2 of the second scanning line presegment data. The length H2 is determined by transforming 1.4° that corresponds to an angular resolution of two scanning lines in the Y-axis direction, as expressed in the polar coordinate system into the distance, as expressed in the rectangular coordinate system and defining it as the length H2. The central coordinates X2 and Z2 are determined as x- and z-coordinates of a central point of a rectangular area defined by the lengths W2 and D2. The central coordinate Y2 is determined by transforming the angle which a line extending from the origin of the X-Y-Z coordinate system to a middle line between the first scanning line and the second scanning line makes with the X-Z plane, as expressed in the polar coordinate system into the distance, as expressed in the rectangular coordinate system and defining it as the coordinate Y2.

The main segment data of the third to sixth scanning lines are produced in the same manner as the second scanning line main segment data as described above. The main segment data produced in each of the first to sixth scanning lines is made up of data elements satisfying three grouping conditions: one being that they either indicate rectangular areas defined by the presegmenting operation performed on the current scanning line or rectangular spaces defined by the main segmenting operation performed one scanning line earlier, the second being that the interval $\Delta X$ in the X-axis direction between the centers of two of the rectangular areas and the rectangular spaces is less than or equal to 20 cm, and the third being that the interval $\Delta Z$ in the Z-axis direction between the centers of two of the rectangular areas and the rectangular spaces is less than or equal to 5 m.

After completion of the presegmenting and main segmenting operation in step 120, the routine proceeds to step 140 to perform a target determining operation which monitors changes in main segments derived in step 120 in time sequence to find movement thereof and defines object models in a four-dimensional space (X, Y. Z , T).

Figure 3:
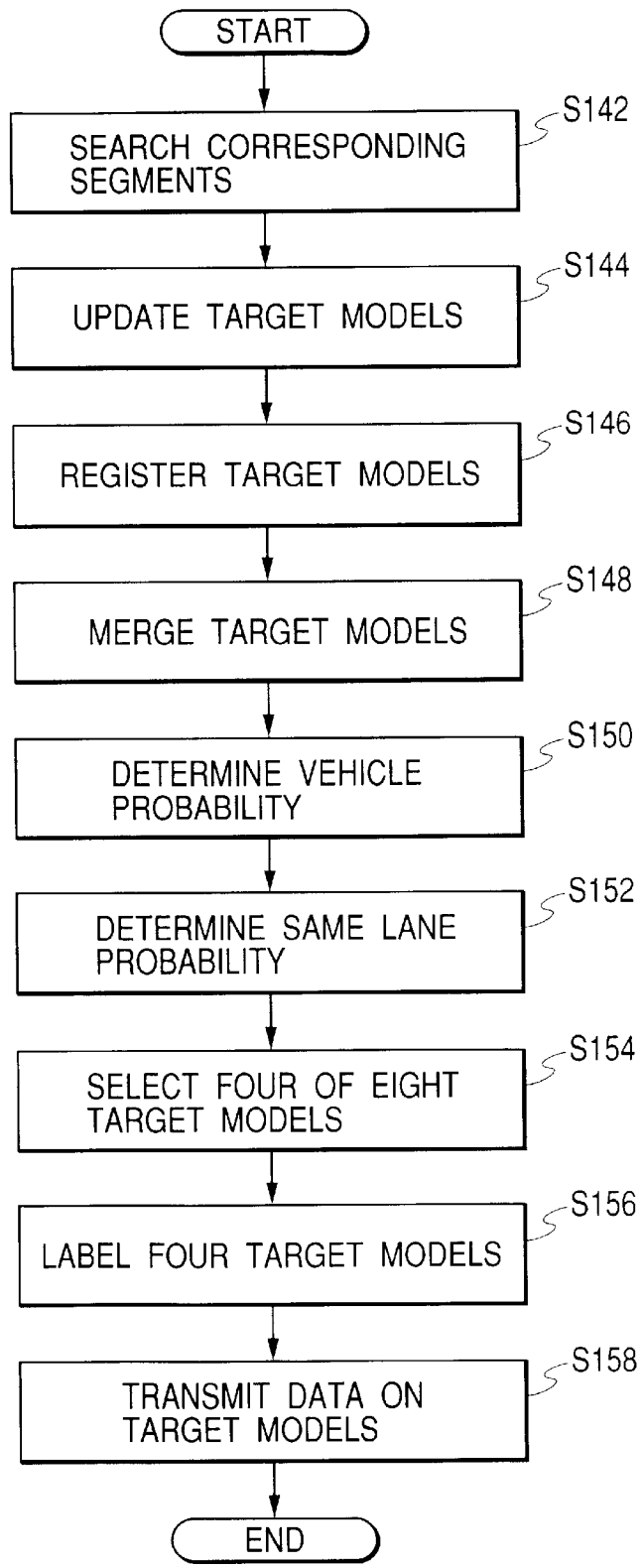
FIG. 3 is a flowchart of a subprogram performed to select targets from obstacles detected by a radar.

After entering step 140, the routine proceeds to a subprogram as shown in FIG. 3.

First, in step 142, the main segment data matching up with target candidates are searched. Specifically, it is determined which main segment data derived in this program cycle matches up with each target candidate produced one program cycle earlier. A total of sixteen (16) main segment data are derived in one program cycle. Of these main segment data, eight (8) ones are, as described later, defined as target models. In the first program cycle, no target candidates are produced, therefore, a maximum of eight main segment data which are closer in distance to the system vehicle are selected as new target candidates.

The routine proceeds to step 144 wherein the main segment data matching up with the target models defined one program cycle earlier are selected as target models to be used in the current program cycle.

The routine proceeds to step 146 wherein the target models selected in step 144 are registered as new target models. Additionally, the main segment data which have not been selected in step 144 are also selected as new target models. If, however, the total number of the new target models is greater than eight (8), eight of them which are closer to the system vehicle are selected as target models to be registered ultimately. For example, eight of the new target models are selected which have a smaller value in a function of $F(X, Z)=(Z/10+90/Z)^2+3X^2$. Japanese Patent First Publication No. 09-318740 teaches such a target model selection, disclosure of which is incorporated herein by reference.

The routine proceeds to step 148 wherein a merging operation is performed on the new target models. If right and left reflectors installed on an automotive vehicle running ahead of the system vehicle are recognized as the target models, they are combined as one target mode. U.S. Pat. No. 5,574,463, issued on Nov. 12, 1996, assigned to the same assignee as that of this application teaches the merging operation, for example, in step 115 of FIG. 5, disclosure of which is incorporated herein by reference.

The routine proceeds to step 150 wherein a vehicle probability which indicates the probability that the target model is an automotive vehicle is determined in terms of the relative speed, the depth D0, and the width W0 of the target model and the time T during which the target model is detected or tracked. For example, if the width of the target model is greater than 5 m or smaller than 0.5 m or a change in relative speed thereof is greater than a reference level which may be considered as the speed of an automotive vehicle traveling ahead of the system vehicle, the vehicle probability is decreased. U.S. Pat. Nos. 5,798,727 and 6,018,308 assigned to the same assignee of this application teach how to determine such a vehicle probability, disclosure of which is incorporated herein by reference.

The routine proceeds to step 152 wherein the same lane probability that a preceding vehicle exists in the same lane of a road as that of the system vehicle is determined in the manner, as described above, using the angular position of the preceding vehicle and the relative speed measured by the laser scan distance measuring unit, and signals indicative of the actual vehicle speed (Vn) and the radius R of a curve in the road on which the system is traveling.

The routine proceeds to step 154 wherein four of a maximum of eight target models registered which have higher same lane probabilities are selected as data to be transmitted to the intervehicle distance controlling ECU 1.

The routine proceeds to step 156 wherein the data on the four target models selected in step 154 are labeled for identification in the intervehicle distance controlling ECU 1.

The routine proceeds to step 158 wherein the data on the four selected target models is transmitted from the laser radar sensor 5 in sequence to the intervehicle distance controlling ECU 1 in a given communication format. The data transmitted contains the relative speed of and the distance to each target model, a parameter indicating whether the target model is a stationary object or a moving object, and probability parameters derived by modifying the same lane probability and the vehicle probability so as to ignore noise components or objects not to be tracked by the laser radar sensor 5.

After completion of the operation in step 158, the routine proceeds to step 160 of FIG. 2 wherein the intervehicle distance controlling ECU 1 determines whether each of the target models transmitted from the laser radar sensor 5 should be tracked as a preceding vehicle traveling ahead of the system vehicle. If one(s) of the target models is selected as the preceding vehicle, the intervehicle distance controlling ECU 1 starts to control the distance to the selected target model.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments witch can be embodied without departing from the principle of the invention as set forth in the appended claims.

For example, the presegmenting operation on data elements closer to the system vehicle in the width-wise direction thereof is, as described above, initiated from the objective beam number determined as a function of the radius of a curve in a road on which the system vehicle is running, however, it may be initiated from the horizontal center of each scanning line when the system vehicle is traveling straight, while when it is determined that the system vehicle is turning a curve, the presegmenting operation may be initiated from a portion of each scanning line shifted inwardly of the curve by an amount which is so selected that it is possible to track a preceding vehicle traveling near the end of the radar detection range.

The obstacle recognition system 350 is designed to recognize targets three-dimensionally, but however, the invention may also be used with an obstacle recognition system designed to recognize targets two-dimensionally.

The intervehicle distance controlling ECU 1 uses the steered angle and the yaw rate measured by the steering sensor 10 and the yaw rate sensor 12 to determine the radius of a curve on a road for determining the objective beam number, however, may store therein a map which lists objective beam numbers corresponding to the radius of the curve and the yaw rate of the system vehicle. Alternatively, the intervehicle distance controlling ECU 1 may be designed to find the configuration of the road based to determine the radius of the curve. The configuration of the road is determined in the following manner for example. Stationary objects are first selected from detected objects based on the relative speeds thereof. Some of the stationary objects which lie in a given size range are selected as roadway delineators. The selected delineators are interpolated to define the outline of the road. The radius of the curve is determined based on the outline of the road. The radius of the curve may alternatively be determined by monitoring a white line(s) printed on the road using a video camera.

What is claimed is:

1. An obstacle recognition apparatus for a vehicle comprising:
    a radar for emitting radar waves to scan a given angular range in a width-wise direction of a vehicle equipped with the obstacle recognition apparatus, said radar further for receiving returns of the radar waves from objects present in the given angular range to determine distances to and angular directions of the objects in the width-wise direction of the vehicle;
    a curve radius determining circuit for determining a radius of a curve in a road on which the vehicle is traveling; and
    an obstacle recognition circuit for analyzing the returns of the radar waves received by said radar to recognize as targets a given number of the objects which are closer to a reference angular direction defined within said given angular range, said obstacle recognition circuit for changing the reference angular direction based on the radius of the curve determined by said curve radius determining circuit and said obstacle recognition circuit for analyzing the returns of the radar waves to recognize the objects as points in a coordinate system and further for performing a grouping operation to collect some of the points which meet a first grouping condition into groups, the grouping operation being initiated from the reference angular direction to the width-wise direction of the vehicle.

2. An obstacle recognition apparatus as set forth in claim 1, wherein said radar is for scanning said given angular range along scanning lines which extend in the width-wise direction of the vehicle and are arrayed at given intervals in a vertical direction of the vehicle within a given vertical angular range, and wherein said obstacle recognition circuit is for performing a second grouping operation to collect some of the points into the groups in each of the scanning lines and also some of the groups which meet a second grouping condition into second grouping condition into second groups as expressing the objects.

3. An obstacle recognition apparatus as set forth in claim 2, wherein the number of the groups formed in the grouping operation along the scanning lines defined in end portions of the given angular range in a height-wise direction of the vehicle is smaller than that along the scanning lines defined in a central portion of the given angular range in the height-wise direction of the vehicle.

4. An obstacle recognition apparatus as set forth in claim 1, wherein said obstacle recognition circuit is for determining a change in the reference angular direction as a function of a shift in angular direction from a central angular direction in said given angular range based on the radius of the curve determined by said radius curve determining circuit.

5. An obstacle recognition apparatus for a vehicle comprising:
    a radar for emitting radar waves to scan a given angular range in a width-wise direction of a vehicle equipped with the obstacle recognition apparatus, said radar receiving returns of the radar waves from objects present in the given angular range to determine distances to and angular directions of the objects in the width-wise direction of the vehicle;
    a curve determining circuit for determining whether a road on which the vehicle is traveling is curved or not; and
    an obstacle recognition circuit for analyzing the returns of the radar waves received by I said radar to recognize as targets a given number of the objects which are closer to a reference angular direction defined within said given angular range, when it is determined by said curve determining circuit that the road is curved, said obstacle recognition circuit shifting the reference angular direction in an inward direction of the curved road and said obstacle recognition circuit further for analyzing the returns of the radar waves to recognize the objects as points in a coordinate system and for performing a grouping operation to collect some of the points which meet a first grouping condition into groups, the grouping operation being initiated from the reference angular direction to the width-wise direction of the vehicle.

* * * * *